US011132334B2

(12) United States Patent
Bent et al.

(10) Patent No.: US 11,132,334 B2
(45) Date of Patent: *Sep. 28, 2021

(54) METHODS AND APPARATUS FOR FILTERING DYNAMICALLY LOADABLE NAMESPACES (DLNS)

(71) Applicant: EMC IP Holding Company LLC, Hopkinton, MA (US)

(72) Inventors: John M. Bent, Los Alamos, NM (US); Sorin Faibish, Newton, MA (US); Patrick S. Combes, Seattle, WA (US); Eriks S. Paegle, Seattle, WA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/138,326

(22) Filed: Sep. 21, 2018

(65) Prior Publication Data

US 2019/0034447 A1 Jan. 31, 2019

Related U.S. Application Data

(63) Continuation of application No. 14/962,663, filed on Dec. 8, 2015, now Pat. No. 10,127,238.

(51) Int. Cl.
*G06F 16/14* (2019.01)
*G06F 16/185* (2019.01)
*G06F 16/22* (2019.01)

(52) U.S. Cl.
CPC ......... *G06F 16/148* (2019.01); *G06F 16/185* (2019.01); *G06F 16/2246* (2019.01)

(58) Field of Classification Search
CPC ...... G06F 16/125; G06F 16/116; G06F 16/22; G06F 16/40; G06F 16/289; G06F 16/86
See application file for complete search history.

(56) References Cited

U.S. PATENT DOCUMENTS 8,229,897 B2 * 7/2012 Cannon ............... G06F 11/1451
707/679
8,751,460 B1 * 6/2014 Annapragada ........ G06F 16/951
707/684

(Continued)

FOREIGN PATENT DOCUMENTS

WO WO 01/52502 A2 * 7/2001

OTHER PUBLICATIONS

U.S. Appl. No. 14/870,968, filed Sep. 30, 2015 entitled "Method and System for Reducing Metadata Overhead in a Two-Tier Storage Architecture".

*Primary Examiner* — Daniel A Kuddus
(74) *Attorney, Agent, or Firm* — Ryan, Mason & Lewis, LLP

(57) ABSTRACT

Methods and apparatus are provided for filtering dynamically loadable namespaces (DLNs). An exemplary method comprises, in response to a job submitted by an application, obtaining a DLN portion of a global single namespace of a file system, wherein the DLN is associated with the job and is maintained in a capacity tier of a storage system; obtaining filtering directives from a user; reducing the DLN using a filtering mechanism on a directory tree associated with the DLN, based on the filtering directives, by removing files in the directory tree of the DLN that do not satisfy requirements of the filtering directives to generate a filtered DLN; and dynamically loading the filtered DLN, including reduced metadata for the filtered DLN relative to the DLN, (Continued)

from the capacity tier into a performance tier of the storage system for processing by the application.

20 Claims, 12 Drawing Sheets

(56) References Cited

U.S. PATENT DOCUMENTS

| | | | |
|---|---|---|---|
| 8,751,483 B1 * | 6/2014 | Annapragada | G06F 16/90335 707/714 |
| 8,768,959 B1 * | 7/2014 | Annapragada | G06F 16/284 707/770 |
| 8,768,974 B1 * | 7/2014 | Annapragada | G06F 16/24544 707/803 |
| 8,832,078 B2 * | 9/2014 | Annapragada | G06F 16/24544 707/720 |
| 8,868,576 B1 * | 10/2014 | Faibish | G06F 16/252 707/755 |
| 8,949,255 B1 | 2/2015 | Faibish et al. | |
| 8,972,441 B2 * | 3/2015 | Annapragada | G06F 16/90335 707/769 |
| 9,223,792 B1 * | 12/2015 | Stacey | G06F 16/907 |
| 9,305,010 B1 * | 4/2016 | Faibish | G06F 16/178 |
| 9,805,053 B1 * | 10/2017 | Tiwari | H04L 67/1097 |
| 2002/0059473 A1 * | 5/2002 | Oshins | G06F 9/4411 719/321 |
| 2007/0185934 A1 * | 8/2007 | Cannon | G06F 11/1469 |
| 2009/0271412 A1 * | 10/2009 | Lacapra | G06F 3/067 |
| 2012/0158669 A1 * | 6/2012 | Morsi | G06F 16/125 707/689 |
| 2014/0214893 A1 * | 7/2014 | Annapragada | G06F 16/284 707/770 |
| 2014/0304299 A1 * | 10/2014 | Yan | G06F 16/182 707/770 |

* cited by examiner

FIG. 5A
DLN Filtering Process

```
/* function job scheduler 257 calls to 2T Daemon 265, e.g., through an RPC service.
 * optimization is to parallelize this work using well-known parallel
 * tree-walking algorithms
 */
function fetch_filtered_dln(OID o, filter f) {
    capacity_tier CT = get_capacity_tier();
    perf_tier PT = get_perf_tier();
    metadata_service MS = get_metadata_service();

/* fetch packed DLN from CT */
    dln d = CT->read(o);

/* walk tree and create entries in PT if passes filter */
    for entry e in tree_walk(d) {
        if not f->matches(e) continue;
        else PT->create_entry(e);
    }

/* save original OID which is needed for unpack */
    MS->put("original_OID", o);
}
```

Filtered DLN Unload Process                                            550

```
/* function job scheduler 257 calls to unload DLN, e.g., through an RPC service
*/
function save_filtered_oid() {
    capacity_tier CT = get_capacity_tier();
    perf_tier PT = get_perf_tier();
    metadata_service MS = get_metadata_service();

OID orig = ms->get("original_oid");

/* when filtered DLN is stored back to CT, merge filtered DLN back into original DLN
     * first convert PT contents into a DLN then walk original DLN and insert missing bits
     * don't insert original things that were deleted; filtering system tracks deletes in metadata
     */
    dln orig_d = CT->read(orig);
    dln new_d = PT->walk_tree();  /* convert PT into a DLN */
    set<entry> unlinks = (set<entry>)MS->get("deletes");
    for entry e in tree_walk(orig_d) {
        if not new_d->contains(e) and not unlinks.contains(e) {
            new_d->insert(e)
        }
    }

OID new_oid = CT->write(new_d);
    /* return OID where new DLN is stored so scheduler can store OID in table 810
     */
    return new_oid;
}
```

FIG. 7A
Reorganized DLN Creation Process  /— 700

```
/* helper function used to create reorganized DLN
*/
function create_reorganized_directories(reorg r) {
    /* first set up the reorganized DLN in PT
     * an example reorg string looks like:
     * pressure in bins {[0-100],[100-200]}; depth in bins {[0-2],[2-4],[4-6]}
     */
    stack<characteristic> characteristics = r->split(';');
    stack<string> directories = [ "" ] /* add one empty one */

/* code here using stacks to iterate over combinatorics
    */
    for characteristic c in characteristics {
        for i in range(0, len(directories)) {
            string dir =directories.pop()
            for bins b in c {
                if dir == ""
                    string new_dir = c.to_string + "." + b
                else
                    string new_dir = dir + "/" + c.to_string + "." + b
                directories.append(new_dir)
                ft->mkdir(new_dir)
            }
        }
    }
}
```

FIG. 7B

DLN Reorganization Process — 740

```
/* function job scheduler 257 calls to reorganize a DLN, e.g., through an RPC service or similar
*/
function fetch_and_reorganize_DLN(OID o, reorg r) {
    capacity_tier CT = get_capacity_tier();
    perf_tier PT = get_perf_tier();
    metadata_service MS = get_metadata_service();

create_reorganized_directories(r);

/* fetch packed DLN from CT
     * for each entry, find its path in the reorganized directories
     * put it there and remember its original path
     */
    din d = CT->read(o);
    for entry e in tree_walk(d) {
        if e->is_dir() continue; /* reorganized only works on files */

/* this next find_bin is a function similar to create_reorganized_directories (FIG. 7A)
         * it will iterate through the characteristics and check extended attributes
         * of the entry to figure out into which bin to place the entry
         */
        string new_path = r->find_bin(e)
        file f = PT->create_entry(hash (new_path))
        f->set_xattr("orig_path", e.to_str())
    }

MS->put("original_oid", o);
}
```

FIG. 7C
Reorganized DLN Save Process 780

```
/* function job scheduler 257 calls to 2T Daemon 265, e.g., through an RPC service
*/
function save_reorganized_oid() {
    capacity_tier CT = get_capacity_tier();
    perf_tier PT = get_perf_tier();
    metadata_service MS = get_metadata_service();

dln d = new dln();

for entry e in ft->tree_walk() {
        string path = e->get_xattr("orig_path")
        d->add_entry(path, e)
    }

OID o = ct->write(d);

/* return OID where new DLN is stored so scheduler can store DLN in table 810
    */
    return o;
}
```

METHODS AND APPARATUS FOR FILTERING DYNAMICALLY LOADABLE NAMESPACES (DLNS)

CROSS-REFERENCE TO RELATED APPLICATION

The present application is a continuation of U.S. patent application Ser. No. 14/962,663, filed Dec. 8, 2015, (now U.S. Pat. No. 10,127,238), incorporated by reference herein, and is related to U.S. patent application Ser. No. 14/870,968, filed Sep. 30, 2015, (now U.S. Pat. No. 10,628,391), entitled "Method and System for Reducing Metadata Overhead in a Two-Tier Storage Architecture," and U.S. patent application Ser. No. 14/962,668, (now U.S. Pat. No. 10,997,126), filed Dec. 8, 2015, entitled "Method and Apparatus for Reorganizing Dynamically Loadable Namespaces (DLNs)," each incorporated by reference herein.

FIELD

The invention relates generally to data storage, and, more particularly, to techniques for filtering and/or reorganizing dynamically loadable namespaces (DLNs).

BACKGROUND

Multi-tier storage environments, such as two-tier storage systems, typically provide a performance tier that employs storage based on performance considerations and a capacity tier that employs storage based on capacity considerations. In this manner, multi-tier storage systems balance between the relative costs of memory and other storage and their relative speeds. Such multi-tier storage environments typically allow particular levels of performance to be achieved at a significantly lower cost than would otherwise be possible.

Metadata is additional data that describes the actual data, such as permissions for the data and where the data is stored. Although most users only care about the actual data, a common bottleneck in storage systems is often the corresponding metadata which is directly related to the number of entries in the storage system. One challenge, however, is that the amount of metadata that must be maintained can often be extremely large. A number of techniques have been proposed to improve metadata performance and/or reduce the amount of required metadata. U.S. patent application Ser. No. 14/870,968, (now U.S. Pat. No. 10,628,391), referenced above, for example, discloses a two-tier storage system that reduces the amount of metadata to be stored in a performance tier by employing dynamically loadable namespaces (DLNs). In particular, a file system is presented as a global single namespace (SN) comprising a plurality of DLNs maintained in a capacity tier of object storage of the storage system. In response to a job submitted by an application, for example, a particular dynamically loadable namespace is dynamically loaded, including the metadata only for the particular dynamically loadable namespace, associated with the job from the capacity tier of object storage into a performance tier of storage of the storage system. Therefore, only a dynamic subset of the data in the capacity tier has metadata in the performance tier.

A need remains for methods and apparatus for filtering and/or reorganizing DLNs that are dynamically loaded into the performance tier according to metadata characteristics, such as file system attributes or user-defined extended attributes.

SUMMARY

Illustrative embodiments of the present invention provide methods and apparatus for filtering dynamically loadable namespaces (DLNs). In one exemplary embodiment, a method comprises the steps of, in response to a job submitted by an application, obtaining a dynamically loadable namespace (DLN) portion of a global single namespace of a file system, wherein the DLN is associated with the job and is maintained in a capacity tier of object storage of a storage system; obtaining one or more filtering directives from a user; reducing said DLN using a filtering mechanism on a directory tree associated with said DLN, based on said one or more filtering directives, by removing one or more files in said directory tree of said DLN that do not satisfy one or more requirements of said one or more filtering directives to generate a filtered DLN; and dynamically loading the filtered DLN, including reduced metadata for the filtered DLN relative to the DLN, from the capacity tier of object storage into a performance tier of storage of the storage system for processing by the application. In one or more exemplary embodiments, the reducing is performed by a daemon in the performance tier or a job scheduler.

In at least one exemplary embodiment, the reducing comprises traversing a directory tree associated with the DLN and, for each entry in the DLN, creating an entry in a directory tree associated with the filtered DLN if the entry satisfies the one or more filtering directives. One or more files in the filtered DLN are optionally reorganized based on one or more reordering directives.

In at least one exemplary embodiment, the filtered DLN is merged into the DLN following one or more modifications to the filtered DLN. The merging comprises, for example, converting a content of the performance tier into a merged DLN, traversing a directory tree associated with the DLN and, for each entry in the DLN, inserting a given entry from the merged DLN if the given entry is not in the DLN. In one or more embodiments, the merging does not insert deleted files in the merged DLN.

As noted above, illustrative embodiments described herein provide significant improvements relative to conventional storage systems by filtering and/or reorganizing DLNs that are loaded into a performance tier to further reduce the amount of metadata that must be loaded and/or improve the organization of the metadata that must be loaded.

BRIEF DESCRIPTION OF THE DRAWINGS

FIGS. 5A and 5B illustrate exemplary pseudocode for exemplary DLN filtering processes;

FIGS. 7A through 7C illustrate exemplary pseudocode for exemplary DLN reordering processes;

DETAILED DESCRIPTION

Figure 1:
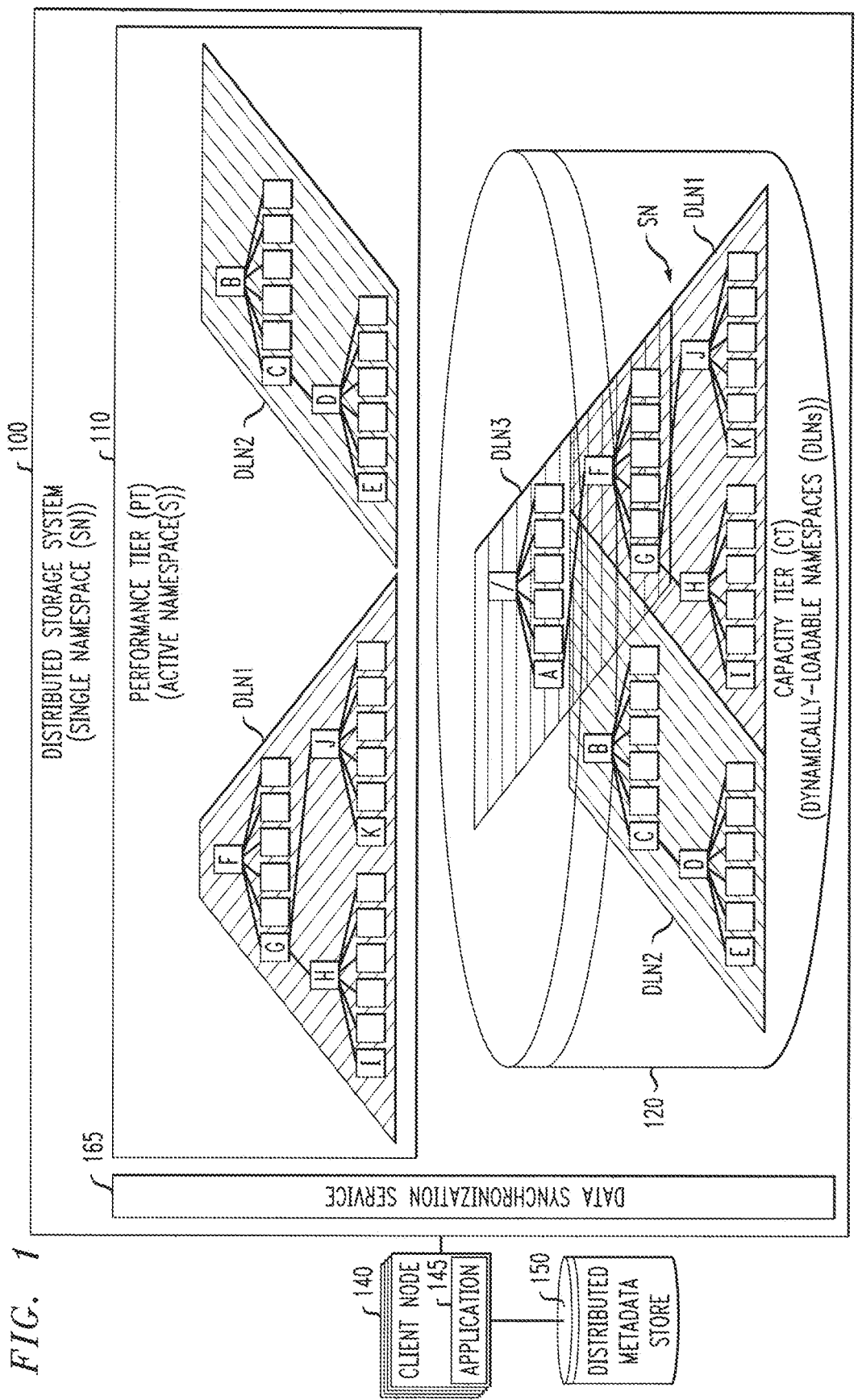
FIGS. 1 and 2 are block diagrams of a two-tier distributed storage system having a single namespace comprised of a plurality of dynamically loadable namespaces according to respective example embodiments of the present invention.

Illustrative embodiments of the present invention will be described herein with reference to an exemplary MapReduce compute architecture and associated compute nodes, storage systems, applications and other processing devices. It is to be appreciated, however, that the invention is not restricted to use with the particular illustrative MapReduce architecture and device configurations shown. Accordingly, the terms "job scheduler" and "job tracker," as used herein, are intended to be broadly construed, so as to encompass, for example, other job scheduling entities in a batch system, a distributed resource management system (DRMS), or a distributed resource manager (DRM), as would be apparent to a person of ordinary skill in the art. Likewise, the term "data node," as used herein, is intended to be broadly construed, so as to encompass, for example, other storage nodes in a job scheduling system, a batch system, a distributed resource management system, or a distributed resource manager.

Object-scale storage systems can comprise billions, if not trillions, of objects. Further, while file system interfaces are ubiquitous and present greater usability, one of ordinary skill in the art will appreciate that limitations in file systems (e.g., a Lustre file system or a General Parallel File System (GPFS)), such as a limited set of inodes, render traditional file system interfaces inoperable for accessing trillion-scale object stores. An inode is a data structure on a filesystem on Linux and other Unix-like operating systems that stores all the information about a file except its name and its actual data.

While object stores excel as a capacity storage solution, they are not as usable or familiar to users as file system interfaces. Further, although most users only care about data, as noted above, a common bottleneck in storage systems is often metadata which is directly related to the number of entries in the storage system. Accordingly, it would be advantageous to be able to present a file system interface on top of, for example, a trillion-scale object store to provide added usability with the scalability of object stores but without the bottleneck of an overwhelming amount of metadata (either in terms of performance or capacity required to store the metadata).

Accordingly, example embodiments of the present invention employ a file system layered over an object store. As will be described in greater detail below, the file system may have a global single namespace comprising a plurality of dynamically loadable namespaces maintained in the capacity tier of object storage in the distributed storage system. In response to a job submitted by an application on a client node, the distributed storage system may dynamically load a particular dynamically loadable namespace, including metadata only for that dynamically loadable namespace, associated with the job from the capacity tier of object storage into the performance tier of storage for the storage system.

According to one aspect of the invention, the metadata of a dynamically loadable DLN can be further reduced using a filtering mechanism. In at least one exemplary embodiment, a user can specify a desired DLN in a job scheduling language, such as Hadoop®, using an augmented specification language that includes one or more filtering commands. Hadoop® is an open-source software framework for storing data and running applications on clusters of commodity hardware.

According to another aspect of the invention, the organization of the metadata that must be loaded for a given DLN can be modified using a reorganization mechanism. In at least one exemplary embodiment, a user can specify a desired DLN in a job scheduling language, such as Hadoop®, using an augmented specification language that includes one or more reorganization commands.

FIG. 1 is a block diagram of a two-tier distributed storage system 100 having a single namespace (SN), comprised of a plurality of dynamically loadable namespaces (DLNs) DLN1, DLN2, DLN3, according to an example embodiment of the present invention. It should be understood that, among other benefits, retaining a single namespace allows unmodified applications to run anywhere without any required knowledge about data locality. As illustrated in FIG. 1, the two-tier distributed storage system 100 comprises a first performance (fast) tier (PT) 110, that employs memory based on performance considerations (e.g., access times), and a second capacity tier (CT) 120, that employs storage based on capacity considerations. In this manner, the two-tier distributed storage system 100 balances between the relative costs of memory and other storage and their relative speeds. It is to be appreciated that more than two storage tiers 110, 120 may be used in other embodiments. As will be described in greater detail below, the distributed storage system 100 may be accessed by client nodes 140 running client applications 145 relying on a distributed metadata storage 150 to identify nodes of the distributed storage system 100 responsible for respective files of the single namespace.

The distributed storage system 100 may have a global single namespace (SN), comprised of a plurality of dynamically loadable namespaces (DLNs), maintained in the capacity tier 120 with one or more active namespaces loaded into the performance tier 110. The distributed storage system 100 also may include a data synchronization service 165 configured to copy the data from the performance tier 110 to the disk-based object storage in the capacity tier (CT) 120 to free the data from, for example, the flash storage in the performance tier 110 when additional capacity in the performance tier 110 is required.

As illustrated in FIG. 1, the capacity tier 120 may store objects storing the plurality of dynamically loadable namespaces (DLNs) comprising the single namespace (SN). For example, the single namespace may describe the file system shown in FIG. 1 with a root (/) and directories A, B, C, D, E, F, G, H, I, J, and K. According to an example embodiment of the present invention, however, the single namespace may be partitioned into a plurality of dynamically loadable namespaces: DLN1 may describe directories F, G, H, I, J, and K; DLN2 may describe directories B, C, D, and E; and DLN3 may describe the root (/), A, F, and G directories. While a dynamically loadable namespace is on the performance tier 110, it's a namespace; while a dynamically loadable namespace is on the capacity tier 120, it's just an object identifier (OID).

To ensure that all jobs on the system can see the entire system as they would expect when run on a monolithic system, the DLNs of different jobs can overlap. In other words, it should be understood that respective portions of the single namespace may reside in a plurality of dynamically loadable namespaces (e.g., directories F and G are in both DLN1 and DLN3). This means that loading a DLN into the PT 110 requires that it be visible across the entire PT 110; presumably, this implies that the DLN be distributed across the complete set of data nodes (e.g., not just the set of data nodes servicing that job), as will be described in greater detail below with respect to FIG. 2.

The exemplary performance (fast) tier (PT) 110 comprises flash memory, such as a DSSD™ flash storage system, commercially available from EMC Corporation of Hopkinton, Mass., or other high-speed memory having a substantially lower access time than the capacity tier (CT) 120. Although flash memory will often be used, other types of low-latency memory could be used instead of flash memory. Typically, such low-latency memories comprise electronic memories, which may be implemented using non-volatile memories, volatile memories, or combinations of non-volatile and volatile memories.

The exemplary capacity tier (CT) 120 may be implemented, for example, using a Distributed Application Object Storage (DAOS) Object Store, proposed by Intel Corporation; a multi disk storage tier, such as an Isilon® storage array, commercially available from EMC Corporation of Hopkinton, Mass.; or ViPR®, a Software-Defined Storage product commercially available from EMC Corporation of Hopkinton, Mass. that abstracts storage from disparate arrays into a single pool of storage capacity.

While example embodiments of the present invention are illustrated herein using multiple storage tiers comprised of a plurality of exemplary storage technologies, such as flash storage, other storage technologies can be employed in each tier, as would be apparent to a person of ordinary skill in the art. In addition, while example embodiments of the present invention are illustrated herein using multiple storage tiers to store, for example, a checkpoint, as noted above, example embodiments of the present invention also apply to the storage of other data, such as other bursty IO tasks, as would be apparent to a person of ordinary skill in the art.

Figure 2:
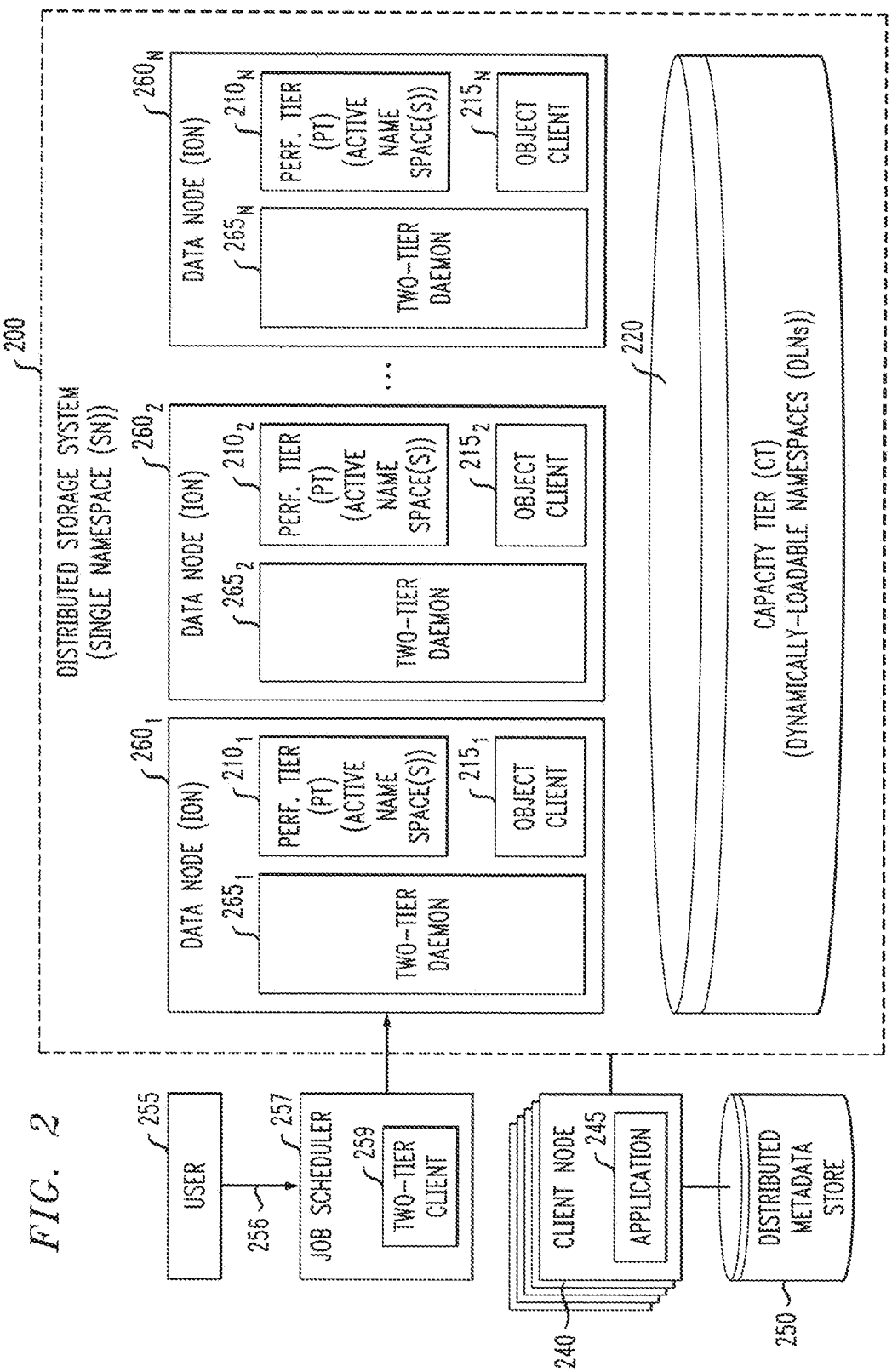

It should be understood that, in certain example embodiments, the architecture illustrated in FIG. 1 may be a Hadoop architecture comprising a name node (which may provide the single namespace (SN) for the two-tier distributed storage system 100), a job tracker, and a Hadoop Distributed File System (HDFS) comprised of a plurality of data nodes (data nodes 260 of FIG. 2). Generally, the exemplary job tracker communicates with the name node to determine the location of data, in a known manner. In addition, the exemplary job tracker optionally assigns each job to a particular data node. When the work is complete, the job tracker optionally updates status information. For a more detailed discussion of conventional aspects of the exemplary Hadoop® architecture, see, for example, Ovum IT Information Management, "Enterprise-Grade Hadoop: The Building Blocks," (Sep. 24, 2014), incorporated by reference herein.

The exemplary name node may maintain the directory tree of all files in the file system, in a known manner, and track where file data is kept across the plurality of data nodes. Client applications 145 operating on client nodes 140 communicate with the name node, for example, when they need to locate a file, or when they want to add, copy, move or delete a file, in a known manner. The name node responds to file requests by returning a list of relevant data nodes where the data is located.

FIG. 2 is a block diagram of a two-tier distributed storage system 200 having a single namespace comprised of a plurality of dynamically loadable namespaces according to an example embodiment of the present invention. As illustrated in FIG. 2, the distributed storage system 200 may include a plurality of data nodes $260_{1-N}$ (260 generally), with each exemplary data node 260 comprising a first performance (fast) storage tier (PT) $210_{1-N}$ (210 generally) and a second capacity storage tier (CT), accessed via a client $215_{1-N}$ (215 generally) discussed further below.

The client nodes 240 may rely on a distributed metadata store 250 to match jobs with dynamically loadable namespaces. For example, when a client node 240 schedules a job, a job scheduler 257 will have a specific name for the task. This job name may be used as an index into a table stored in the distributed metadata store 250 to determine an object identifier (OID) of a dynamically loadable namespace (DLN) to be loaded into the performance tier 210 for processing the job. Inside the OID may be a tree of namespace for population into the performance tier 210. When the job is finished, the files in the dynamically loadable namespace are moved to objects, and the file is replaced with an OID. As will be described in greater detail below, the directory namespace metadata also may be compressed and stored as an object with an OID matching the index table. To ensure that only a dynamically loadable namespace (i.e., subset, or subtree, of the global metadata) resides in the performance tier 210 at any one time, the distributed storage system 200 must know which DLNs are required or desirable at any one time. Accordingly, in example embodiments of the present invention, a user may specify a DLN (i.e., subtree) when submitting a job to the scheduler 257.

As illustrated in FIG. 2, each exemplary data node 260 also comprises a two-tier (2T) daemon $265_{1-N}$ (265 generally) that intercepts read and write operations (i.e., I/Os) from applications 245. According to one aspect of the invention, as will be described in greater detail below, the exemplary two-tier daemons 265 store newly written data synchronously into the performance tier (PT) 210 so that the client nodes 240 see low latency, high performance write operations. In addition, the exemplary two-tier daemons 265 optionally asynchronously copy the data from the performance tier 210 to the disk-based storage in the capacity tier (CT) 220 to free the data from, for example, the flash storage in the performance tier 210 when additional capacity in the performance tier 210 is required. It should be understood that a plurality of data nodes 260 may share a flash storage system, such as a flash-based DSSD storage system.

According to one aspect of the invention, a user 255 can specify a desired DLN to the job scheduler 257 using an augmented specification language that includes one or more filtering and/or reorganizing commands 256, as discussed further below. The job scheduler 257 employs a two-tier client 259 to communicate the filtering and/or reorganizing commands 256 to the two-tier daemon 265.

As indicated above, one or more data nodes 260 of FIG. 2 comprises a performance storage tier 210 and a capacity storage tier 220 accessed via respective object clients $215_{1-N}$ (215 generally). It is to be appreciated, however, that more than two storage tiers may be used in one or more exemplary data nodes 260 in other embodiments. The exemplary performance storage tier 210 and capacity storage tier 220 comprise respective disjoint subsets of storage. The performance storage tier 210 and capacity storage tier 220 in this embodiment comprise different types of storage devices having different performance characteristics. In the present embodiment, the exemplary performance storage tier 210 comprises flash storage devices and the exemplary and capacity storage tier 220 comprises one or more disk-based object storage devices.

The flash storage devices of the performance storage tier 210 are generally significantly faster in terms of read and write access times than the disk storage devices of the capacity storage tier 220. The flash storage devices are therefore considered "fast" devices in this embodiment relative to the "slow" disk storage devices. Accordingly, the exemplary architecture may be characterized in the present embodiment as having a "fast" storage tier 210 and a "slow" storage tier 220, where "fast" and "slow" in this context are relative terms and not intended to denote any particular absolute performance level. However, numerous alternative tiering arrangements may be used, including three or more tiers, each providing a different level of performance. The particular storage devices used in a given storage tier may be varied in other embodiments, and multiple distinct storage device types may be used within a single storage tier.

The flash storage devices of the performance storage tier 210 generally provide higher performance than the disk storage devices of the capacity storage tier 220 but the disk storage devices of the capacity storage tier 220 generally provide higher capacity at lower cost than the flash storage devices of the performance storage tier 210. The exemplary tiering arrangement of the exemplary data nodes 260 in FIG. 2 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the architecture, leading to enhanced system performance relative to conventional arrangements, while additionally or alternatively providing an ability to achieve particular levels of performance at lower cost.

It should be understood that, in a preferred embodiment, I/O from the client nodes 240 is balanced across the set of data nodes 260. For example, each application 245 running on a client node 240 may write to only a single data node 260. This will further improve performance by reducing the number of network connections and network transfers. Balancing reads can be done similarly by spreading data across the distributed storage system 200 and replicate hot spots when useful. By distributing namespace responsibility across the performance tier 210, metadata accesses are similarly balanced. In certain embodiments, mapping files to data nodes 260 (and their respective two-tier daemons 265) can be done with, for example, hashing algorithms or with a second layer of metadata indirection with hashing being preferred, as it reduces the number of network round-trips between the client node 240 and the data node 260.

U.S. patent application Ser. No. 14/870,968, (now U.S. Pat. No. 10,628,391), referenced above, describes exemplary techniques for storing a plurality of files in a directory as a respective plurality of objects in a capacity tier of object storage. Example embodiments represent the plurality of files in the directory as a plurality of respective objects which then may be stored in the capacity tier of object storage in the storage system.

Figure 3:
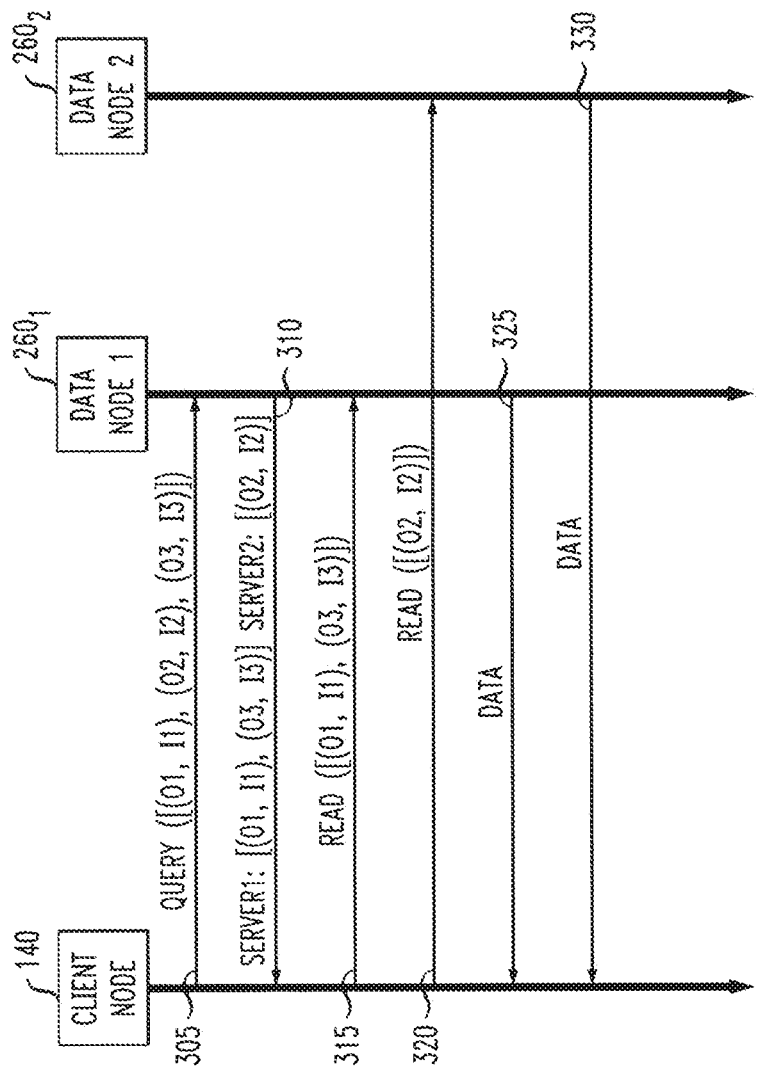
FIG. 3 is a state diagram illustrating a method for reading data in a two-tier distributed storage system according to an example embodiment of the present invention.

FIG. 3 is a state diagram illustrating a method including a redirect mechanism for reading data in a two-tier distributed storage system, according to an example embodiment of the present invention and may be described with reference to FIG. 2. When a client node 140 reads, it will request (i.e., query) metadata 305 (e.g., offsets, O, and lengths, l) from a data node 260 and, in response to the metadata identifying data locations 310, direct its read input/output (I/O) operations 315, 320 to data nodes 260₁, 260₂ in the performance tier 210 on which the target data resides. The data nodes 260 then return data 325, 330 to the client node 140. By synchronously serializing metadata access, the data nodes 260 ensure both that readers see the most recent data and, as will be described in greater detail below, ensuring that overwrites are applied in the correct order. This mechanism binds both processes within a single job as well as processes across multiple jobs into the shared namespace ensuring that cross-job reads and writes work the same as if they were run on a monolithic traditional single tiered system.

DLN Filtering

According to one aspect of the invention, the metadata of a dynamically loadable DLN can be further reduced using a filtering mechanism, where one or more files in an original namespace of a DLN that do not satisfy a filtering command are removed in a filtered DLN namespace. In at least one exemplary embodiment, a user can specify a desired DLN in a job scheduling language, such as Hadoop, using an augmented specification language that includes one or more filtering commands. A number of exemplary filtering criteria are discussed further below in conjunction with Table 1.

Figure 4:
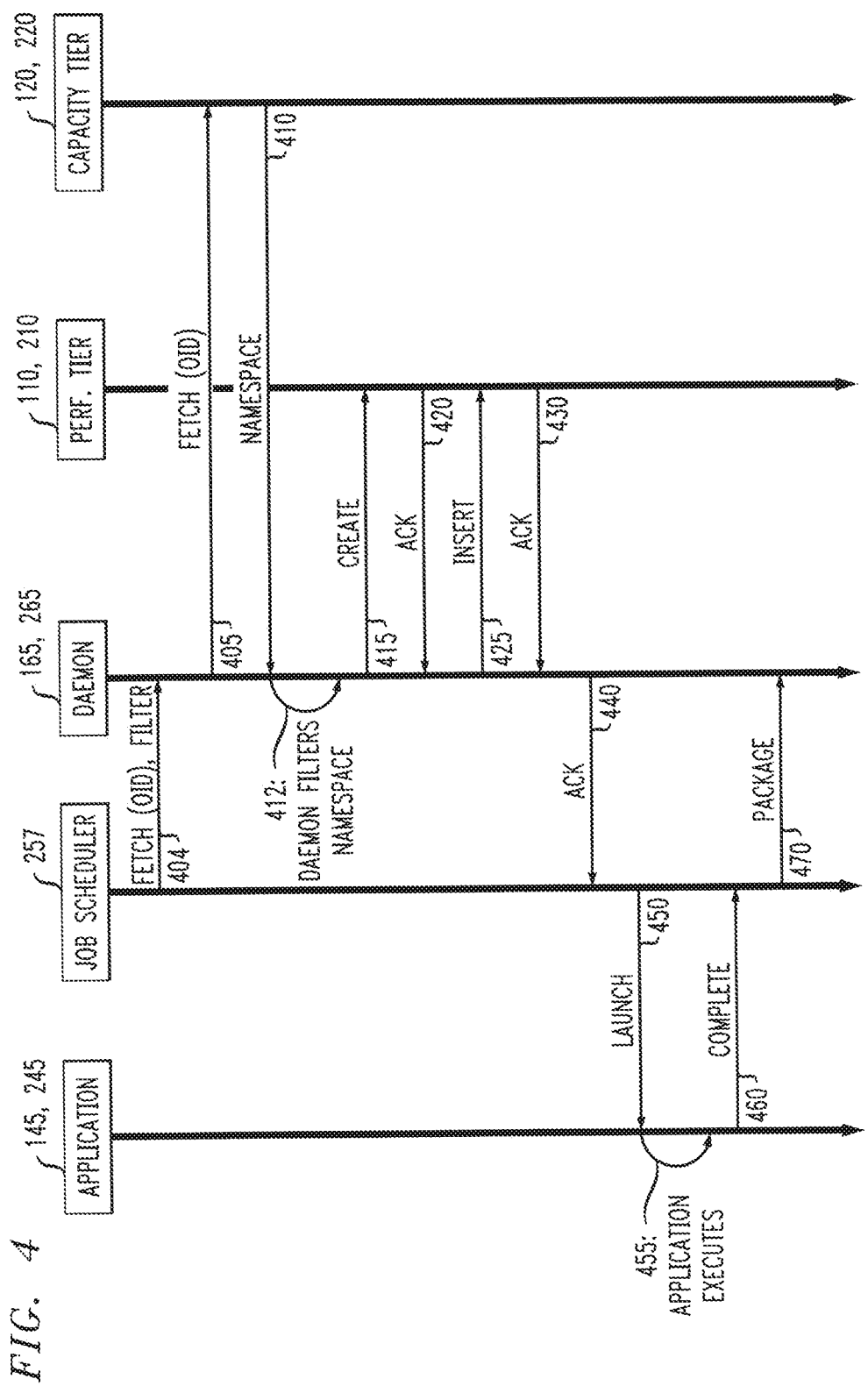
FIG. 4 is a state diagram illustrating a method for importing a filtered dynamically loadable namespace into a performance tier of a two-tier distributed storage system according to an example embodiment of the present invention.

FIG. 4 is a state diagram illustrating a method for importing a filtered dynamically loadable namespace into a performance tier 110, 210 of a two-tier distributed storage system 100, 200, according to an example embodiment of the present invention. As noted above, a user 255 sends one or more filter commands 256 to the job scheduler 257.

As illustrated in FIG. 4, the job scheduler 257 then sends a fetch command indicating the OID of the desired DLN, together with the filter command(s) 256 to the two-tier daemon 265 (404). The two-tier daemon 265 then fetches the DLN from the capacity tier 220 by OID (405). The capacity tier 220 then returns the requested (unfiltered) DLN (410). The two-tier daemon 265 filters the namespace according to the filter command(s) 256 (412). In one variation, the filtering can be performed by the job scheduler 257, as would be apparent to a person of ordinary skill in the art.

The two-tier daemon 265 creates an initial entry into the performance tier 110, 210 namespace (415), receives a first acknowledgement from the performance tier (420), inserts the filtered DLN into the namespace in the performance tier 110 by populating the filtered namespace with the objects representing the files of the filtered namespace (425), and receives a second acknowledgement from the performance tier (430). The two-tier daemon 265 then sends an acknowledgement to the job scheduler 257 (440).

The job scheduler 257 launches the application 145 on client node 140 to start the job with the filtered namespace (450) and the application executes on the filtered namespace (455). Once the application completes, it sends a notification to the job scheduler 257 (460). The job scheduler 257 notifies the two-tier daemon 265 to package the filtered namespace and return the filtered namespace to the capacity tier 120 (470), for example, using a Linux® tar command, as discussed further below in conjunction with FIG. 5B. Generally, the two-tier daemon 265 merges the modifications on the filtered namespace back into the original DLN.

FIG. 5A illustrates exemplary pseudocode for an exemplary implementation of a DLN filtering process 500. As shown in FIG. 5A, the exemplary DLN filtering process 500 initially gets variables (e.g., handles) for the capacity tier (CT), performance tier (PT) and metadata service (MS).

The exemplary DLN filtering process 500 then reads the DLN from the capacity tier into the performance tier using the OID o. In one exemplary implementation, the DLN can be read as an opaque "blob" into a buffer and then a Linux® tar command can be executed to transform from the "blob" from the buffer into a namespace. The process 500 walks the DLN tree and creates entries in the performance tier if the object matches the filter requirements using the "if not/else" statements. The walking can be done, for example, using available tree-walking algorithms such as those described in https://github.com/pftool/pftool and https://github.com/hpc/fileutils.

The original OID is also stored, which is needed for the unpacking process. The process 500 can optionally be parallelized using well-known parallel processing techniques.

FIG. 5B illustrates exemplary pseudocode for an exemplary implementation of a filtered DLN unload process 550. As shown in FIG. 5B, the exemplary filtered DLN unload process 550 initially gets variables (e.g., handles) for the capacity tier (CT), performance tier (PT) and metadata service (MS), in a similar manner to FIG. 5A.

The filtered DLN unload process 550 then obtains the original DLN using the saved OID, for example, by obtaining it from the capacity tier or from an optional cache. The modifications to the filtered namespace are then merged into the original DLN. If a user creates a file in a filtered DLN which would appear in an unfiltered DLN, the merge could, for example, disallow the persist, could overwrite the existing file, or could create some sort of a conflict mechanism to force the user to make the appropriate decision.

The filtered DLN unload process 550 performs a tree walk on the original DLN namespace and inserts missing objects. If files in the filtered namespace were deleted, they are recorded in metadata (e.g., unlinks is a deleted file list). If a file from the original DLN was not in filterered (i.e., it did not satisfy the filter and was temporarily invisible and persisted unmodified), the invisble file is returned into the modified new DLN.

The new DLN is then stored using a Linux® tar command, in the manner described above, transform from a "blob" in a buffer into the namespace. The OID of the filtered DLN is stored in a table 810, as discussed further below in conjunction with FIG. 8.

The filtered DLN unload process 550 can optionally be parallelized.

For example, in an exemplary Hadoop® job scheduling system, the filtering commands 256 can be expressed as follows:

mapred.dln.filter="where isfile( ) and (group='seismic' and extension='dat' and size>=1 GB)".

This SQL-like statement limits the DLN to include only those files that are larger than one gigabyte with an extension .dat (e.g., experimental binary data) belonging to the seismic group.

Similarly, for an exemplary SLURM workload manager, the filtering commands 256 can be expressed as follows:
SBATCH--dln_filter="where isfile( ) and (group='seismic' and extension='dat' and size>=1 GB)".

In this manner, the filtering can remove extraneous entries from an exemplary namespace comprising large experimental data files (e.g., entries which are not pertinent to a data working set).

The following Table 1 illustrates a typical set of common attributes in file system inodes that can be used in the filtering specifications. These are all candidates for user filtering expressions.

| Size | Name | Use |
| --- | --- | --- |
| 2 | Mode | Can this file be read/written/executed? |
| 2 | Uid | Who owns this file? |
| 4 | Size | How many bytes are in this file? |
| 4 | Time | What time was this file last accessed? |
| 4 | Ctime | What time was this file created? |
| 4 | Mtime | What time was this file last modified? |
| 4 | Dtime | What time was this inode deleted? |
| 2 | Gid | Which group does this file belong to? |
| 2 | links_count | How many hard links are there to this file? |
| 4 | Blocks | How many blocks have been allocated to this file? |
| 4 | Flags | How should ext2 use this inode? |
| 4 | osd1 | An OS-dependent field |
| 60 | Block | A set of disk pointers (15 total) |
| 4 | Generation | File version (used by NFS) |
| 4 | File_acl | File access control list |
| 4 | Dir_acl | Directory access control list |
| 4 | faddr | An unsupported field |
| 12 | I_osd2 | An OS-dependent field |

Additional filtering is also possible using user-defined extended attributes that can be retrieved from files. See, U.S. Pat. No. 8,949,255, entitled "Methods and Apparatus for Capture and Storage of Semantic Information with Sub-Files in a Parallel Computting System," incorporated by reference herein, where a data structure description containing a user specification of semantic information related to a given file is applied to a Parallel Log-Structured File System (PLFS). PLFS generates one or more sub-files and also outputs the data structure description containing the semantic information (in addition to the conventional file metadata of, e.g., an offset and length). In this manner, the data structure description containing the semantic information can be stored with the sub-files in one or more storage nodes of the parallel computing system.

DLN Reorganization

According to another aspect of the invention, the organization of the metadata that must be loaded for a given DLN can be modified using a reorganization mechanism, where one or more files are moved to a different portion of the namespace. In at least one exemplary embodiment, a user can specify a desired DLN in a job scheduling language, such as Hadoop, using an augmented specification language that includes one or more reorganization commands. In this manner, the usability of a namespace can be improved through a reorganization allowing users to think of their data in multiple ways and not just as limited by a restrictive POSIX hierarchy. Additional primitives are provided to allow the user to reorganize the shape, organization, and/or dimensionality of the namespace to organize the files in a different organization than the original directory hierarchy.

The reorganization creates a directory structure matching a (simplified) histogram representation of the data by grouping semantically related files. Note that although this example shows statistical binning, other groupings, such as by owner or file type for example, are also possible. In fact, every attribute used for filtering can also be used for grouping. Note further that the groupings can be hierarchical as is shown in the example by first grouping by pressure and then by temperature.

Figure 6:
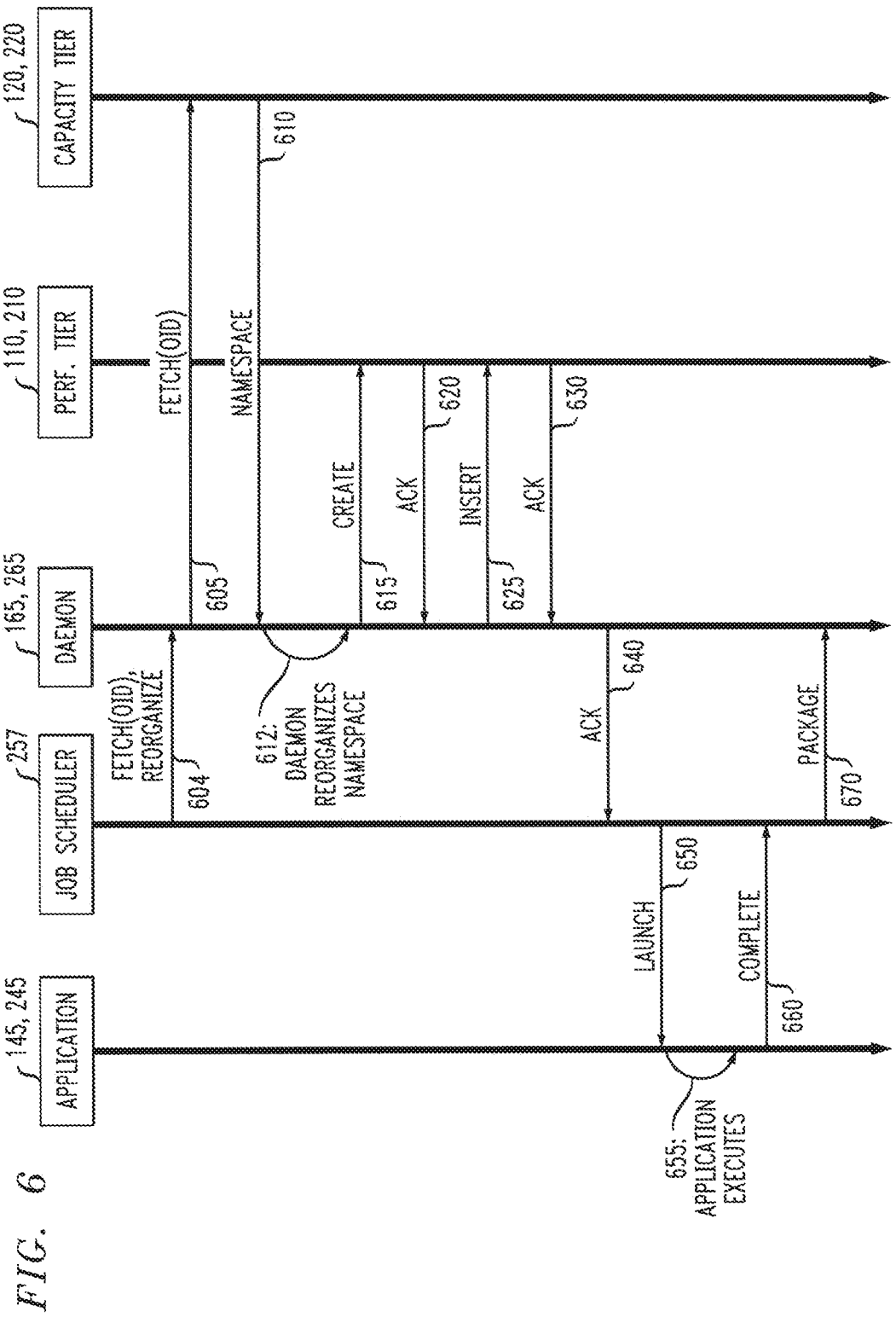
FIG. 6 is a state diagram illustrating a method for importing a reorganized dynamically loadable namespace into a performance tier of a two-tier distributed storage system according to an example embodiment of the present invention.

FIG. 6 is a state diagram illustrating a method for reordering and importing a dynamically loadable namespace into a performance tier 110, 210 of a two-tier distributed storage system 100, 200, according to an example embodiment of the present invention. As noted above, a user 255 sends one or more reordering commands 256 to the job scheduler 257.

As illustrated in FIG. 6, the job scheduler 257 then sends a fetch command indicating the OID of the desired DLN, together with the reorder command(s) 256 to the two-tier daemon 265 (604). The two-tier daemon 265 then fetches the DLN from the capacity tier 220 by OID (605). The capacity tier 220 then returns the requested (original) DLN (610). The two-tier daemon 265 reorganizes the namespace according to the reorder command(s) 256 (612). In one variation, the reorganizing can be performed by the job scheduler 257, as would be apparent to a person of ordinary skill in the art.

The two-tier daemon 265 creates an initial entry into the performance tier 110, 210 namespace (615), receives a first acknowledgement from the performance tier (620), inserts the reorganized DLN into the namespace in the performance tier 110 by populating the reorganized namespace with the objects representing the files of the reorganized namespace (625), and receives a second acknowledgement from the performance tier (630). The two-tier daemon 265 then sends an acknowledgement to the job scheduler 257 (640).

The job scheduler 257 launches the application 145 on client node 140 to start the job with the reorganized namespace (650) and the application executes on the reorganized namespace (655). Once the application completes, it sends a notification to the job scheduler 257 (660). The job scheduler 257 notifies the two-tier daemon 265 to package the reorganized namespace and return the reorganized namespace to the capacity tier 120 (670), as discussed further below in conjunction with FIG. 7C. Generally, the two-tier daemon 265 merges the modifications on the reorganized namespace back into the original DLN.

FIG. 7A illustrates exemplary pseudocode for an exemplary implementation of a reorganized DLN creation process 700. As shown in FIG. 7A, the exemplary reorganized DLN creation process 700 initially sets up the reorganized DLN in the performance tier. For example, a reorganization string might look like the following:

pressure in bins {[0-100],[100-200] }; depth in bins {[0-2], [2-4], [4-6] }, where the DLN is reorganized based on two extended attribute characteristics: pressure (top level) and depth. For example, files having a pressure value (an extended attribute) between 0 and 100 are placed in a first bin and files having a pressure value between 100 and 200 are placed in a second bin. Within each pressure bin, there are child directories for the three exemplary depth bins. Each file can be stored in one of six bins, based on the extended pressure and depth attributes. For example, a pressure bin can be identified for a file, and then which depth bin inside the assigned pressure bin.

The exemplary reorganized DLN creation process 700 includes code to parse the reorganizatiaon string into directory structure. If the above example was input as a reorganization command, then the resulting directories will be:

pressure.0-100
  depth.0-2
  depth.2-4
  depth.4-6 pressure.100-200
  depth.0-2
  depth.2-4
  depth.4-6

For example, consider the exemplary user who has filtered the DLN to only include large experimental data. This user now further wants to change how the files are grouped. Semantically, what is most meaningful to this example user, who is analyzing seismic experimental data, is the pressure recorded in each experimental file followed by the depth. Assume these values were determined previously and have been stored in the extended attributes of each file. The reorganization specification is added to the previous filtering (Slurm) specification to show how the filtering and reorganizing aspects are complementary and add additional cumulative value when used together:

SBATCH--dln={dir=/2t/bentj/proj1/;depth=3;lazy=1};
SBATCH--dln_filter="where isfile( ) and (group=='seismic' and extension=='dat' and size>=1 GB)";
SBATCH--dln_reorg="pressure in bins {[0-100],[100-200]}, depth in bins {[0-2],[2-4],[4-6]}".

Using these specifications, the files are dynamically rearranged into a new directory hierarchy to allow the user more convenient access to related files using standard POSIX tools. In this manner, the original DLN introduces metadata reduction, the filtered DLN further reduces the metadata, and finally a reorganized, filtered DLN provides both improved usability and metadata reduction.

The reorganized DLN is organized by the user specified semantic groupings. In one exemplary implementation, individual file names can be changed to random and unique values, to ensure there is no namespace collision when files of common names are grouped together. The original path can be preserved in an extended attribute accessible to the user. Alternatively, the name can be a concatenation of the full path (e.g. /usr/johnbent/proj1/data.1 becomes usr.johnbent.proj1.data.1).

FIG. 7B illustrates exemplary pseudocode for an exemplary implementation of a DLN reorganization process 740. As shown in FIG. 7B, the exemplary DLN reorganization process 740 initially gets variables (e.g., handles) for the capacity tier (CT), performance tier (PT) and metadata service (MS), in a similar manner to FIG. 5A.

The exemplary DLN reorganization process 740 then calls the create_reorganized_directories(r) function of FIG. 7A to create the reorganized directories. The original packed DLN is fetched from the capacity tier (e.g., using Linux tar commands, as discussed above). For each entry in the original packed DLN, the exemplary DLN reorganization process 740 finds its path in the reorganized directories, places the file in the new path (e.g., in a bin based on the defined extended attributes used for reorganization) and stores the original path. For each characteristic, the attribute is evaluated and the file is placed in the appropriate bin. It is noted that directories in the original packed DLN are skipped, as only files are reorganized. As noted above, the new path name can be hashed to ensure a unique name. The exemplary DLN reorganization process 740 can optionally be parallelized.

FIG. 7C illustrates exemplary pseudocode for an exemplary implementation of a reorganized DLN save process 780. As shown in FIG. 7C, the exemplary reorganized DLN save process 780 initially gets variables (e.g., handles) for the capacity tier (CT), performance tier (PT) and metadata service (MS), in a similar manner to FIG. 5A.

The exemplary reorganized DLN save process 780 walks the directory tree and merges the original DLN and the reorganized DLN, by finding the original location and putting those entries into the reorganized DLN. The OID of the reorganized DLN is stored in a table 810, as discussed further below in conjunction with FIG. 8.

Figure 8:
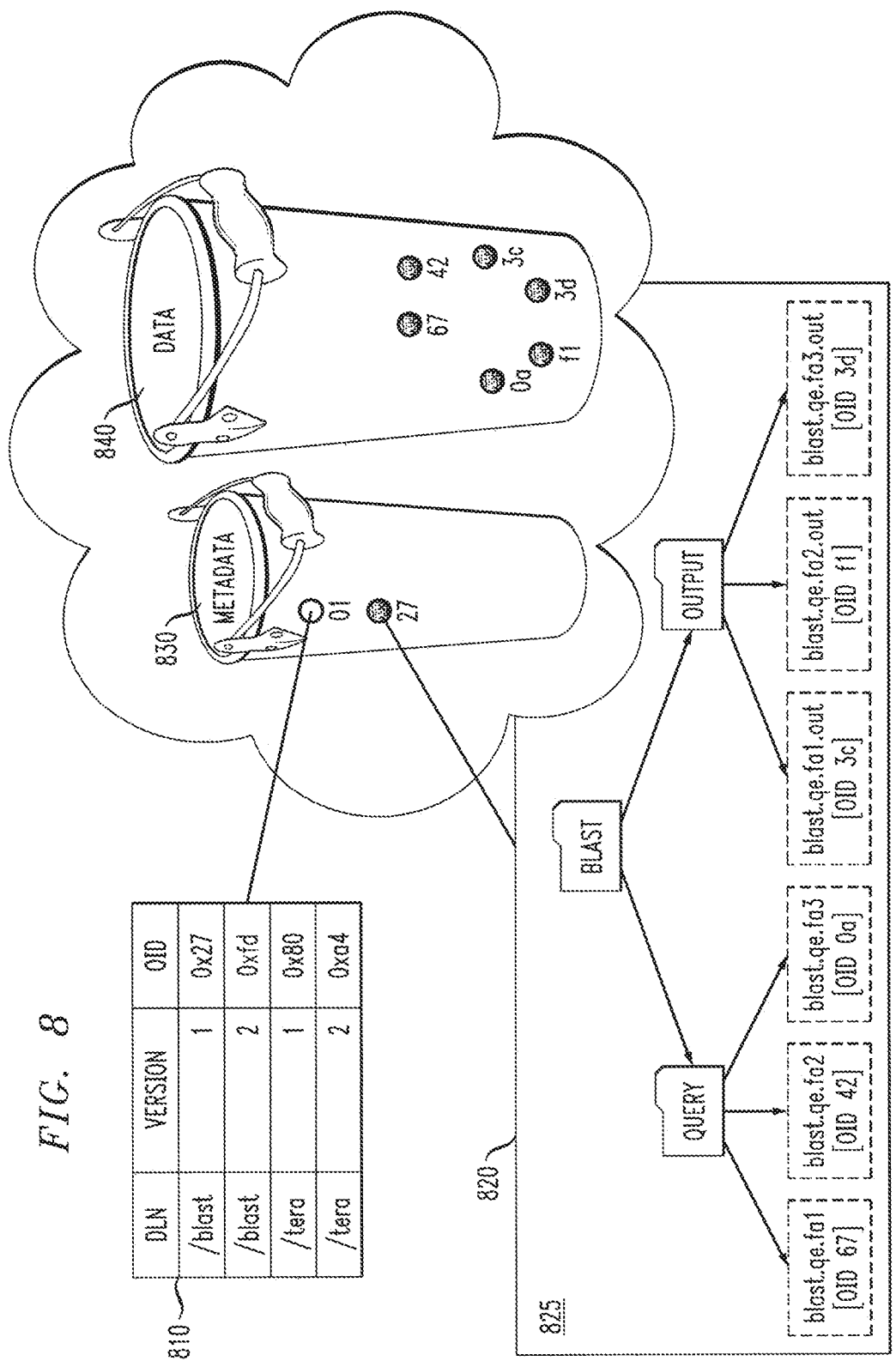
FIG. 8 illustrates various aspects of the data and metadata associated with a number of DLNs.

FIG. 8 illustrates various aspects of data 840 and corresponding metadata 830 associated with a number of DLNs. As shown in FIG. 8, a DLN table 810 stores a DLN identifier, version number and OID. For example, the same DLN (/blast) has different version numbers (1 and 2) and different OIDs (27 and fd). The DLN/blast version 1 is loaded, a user made makes some modifications, and then when the DLN is unloaded, the DLN is assigned a new version number (2). In this manner, each version is stored with a different OID. The actual OID numbers can be randomly generated. In one or more embodiments, monotonically increating OIDs facilitates finding the most recent OID. Metadata 01 in metadata 830 points to the DLN table 810.

In addition, the OID for each DLN points to the DLN. For example, metadata 830 comprises OID 27 of DLN/blast pointing to the corresponding DLN 820, having a namespace 825. The data 840 for namespace 825 comprises data objects having OIDs 67, 42, 0a, 3c, f1 and 3d.

CONCLUSION

The foregoing applications and associated embodiments should be considered as illustrative only, and numerous other embodiments can be configured using the techniques disclosed herein, in a wide variety of different cryptography applications.

It should also be understood that the DLN filtering and reordering techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The storage system may be implemented using one or more processing platforms. One or more of the processing modules or other components may therefore each run on a computer, storage device or other processing platform element. A given such element may be viewed as an example of what is more generally referred to herein as a "processing device."

Figure 9:
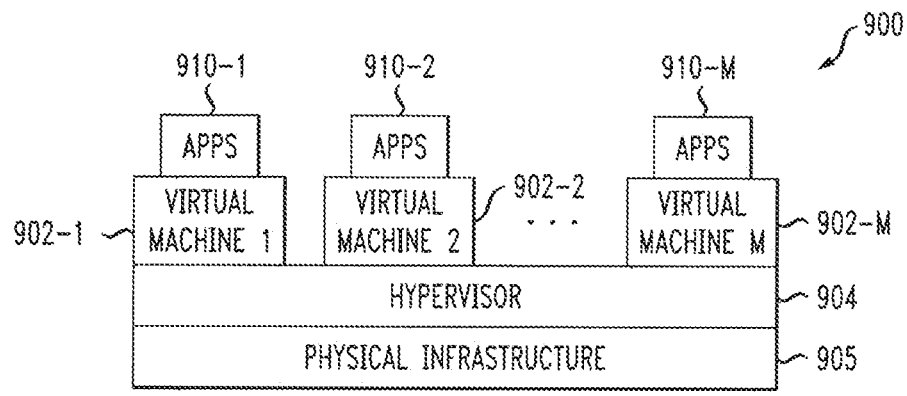
FIG. 9 illustrates an exemplary processing platform that may be used to implement at least a portion of one or more embodiments of the invention comprising a cloud infrastructure.

Referring now to FIG. 9, one possible processing platform that may be used to implement at least a portion of one or more embodiments of the invention comprises cloud infrastructure 900. The cloud infrastructure 900 in this exemplary processing platform comprises virtual machines (VMs) 902-1, 902-2, . . . 902-M implemented using a hypervisor 904. The hypervisor 904 runs on physical infrastructure 905. The cloud infrastructure 900 further comprises sets of applications 910-1, 910-2, . . . 910-M running on respective ones of the virtual machines 902-1, 902-2, . . . 902-M under the control of the hypervisor 904.

The cloud infrastructure 900 may encompass the entire given system or only portions of that given system, such as one or more of client, servers, controller, authentication server or relying server in the system.

Although only a single hypervisor 904 is shown in the embodiment of FIG. 9, the system may of course include multiple hypervisors each providing a set of virtual machines using at least one underlying physical machine.

An example of a commercially available hypervisor platform that may be used to implement hypervisor 904 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 10:
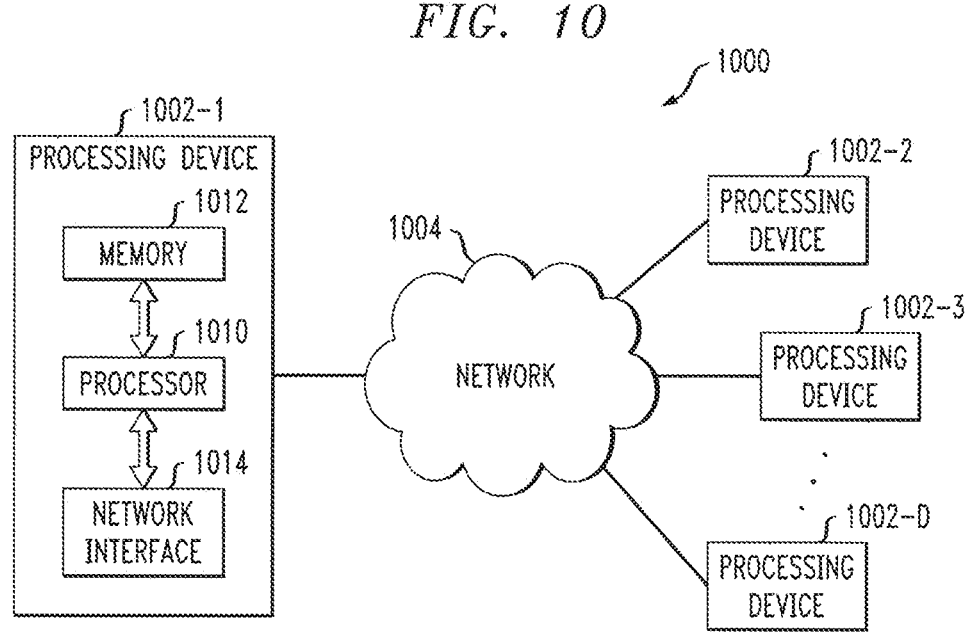
FIG. 10 illustrates another exemplary processing platform that may be used to implement at least a portion of one or more embodiments of the invention.

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-D, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "computer program product" having executable computer program code embodied therein, may comprise random access memory (RAM), read only memory (ROM) or other types of memory, in any combination.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 9 or 10, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of storage systems that can benefit from the DLN filtering and reordering techniques disclosed herein. Also, the particular configuration of storage system and processing device elements shown herein, and the associated DLN filtering and reordering techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
in response to a job submitted by an application, obtaining, using a two-tier daemon, a dynamically loadable namespace (DLN) portion of a global single namespace of a file system, wherein said DLN is associated with the job and is obtained by said two-tier daemon from a capacity tier of object storage of a storage system;
obtaining one or more filtering directives from a user;
reducing said DLN using a filtering mechanism on a directory tree associated with said DLN, based on said one or more filtering directives, by removing one or more files in said directory tree of said DLN that do not satisfy one or more requirements of said one or more filtering directives to generate a filtered DLN; and
dynamically loading, by said two-tier daemon, the filtered DLN, including reduced metadata for the filtered DLN relative to said DLN, from the capacity tier of object storage into a performance tier of storage of the storage system for processing by said application, wherein said dynamically loading by said two-tier daemon comprises:
creating an entry into a performance tier namespace of said performance tier;
receiving a first acknowledgement from said performance tier;
inserting said filtered DLN into said performance tier namespace of said performance tier by populating said filtered DLN with one or more objects representing one or more files of said filtered DLN; and
receiving a second acknowledgement from said performance tier,
wherein the method is performed by at least one processing device comprising a processor coupled to a memory.

2. The method of claim 1, wherein the reducing is performed by one or more of said two-tier daemon in the performance tier and a job scheduler, and wherein said two-tier daemon provides a third acknowledgement to said job scheduler in response to said receiving said second acknowledgement from said performance tier.

3. The method of claim 1, further comprising the step of merging said filtered DLN into said DLN following one or more modifications to said filtered DLN.

4. The method of claim 3, wherein said merging comprises the steps of converting a content of said performance tier into a merged DLN, traversing a directory tree associated with said DLN and, for each entry in said DLN, inserting a given entry from said merged DLN when said given entry is not in said DLN.

5. The method of claim 3, wherein said merging does not insert deleted files in said merged DLN.

6. The method of claim 1, further comprising the step of reorganizing one or more files in said filtered DLN based on one or more reordering directives.

7. The method of claim 1, wherein the dynamically loading the filtered DLN into the performance tier comprises:
fetching the DLN from the capacity tier of object storage;
receiving the DLN from the capacity tier of object storage;
performing said reducing of said DLN based on said one or more filtering directives to generate said filtered DLN;
creating a namespace in the performance tier for the filtered DLN; and
inserting the filtered DLN into the performance tier of storage.

8. A non-transitory machine-readable recordable storage medium, wherein one or more software programs when executed by one or more processing devices implement the following steps:
in response to a job submitted by an application, obtaining, using a two-tier daemon, a dynamically loadable namespace (DLN) portion of a global single namespace of a file system, wherein said DLN is associated with the job and is obtained by said two-tier daemon from a capacity tier of object storage of a storage system;
obtaining one or more filtering directives from a user;
reducing said DLN using a filtering mechanism on a directory tree associated with said DLN, based on said one or more filtering directives, by removing one or more files in said directory tree of said DLN that do not satisfy one or more requirements of said one or more filtering directives to generate a filtered DLN; and
dynamically loading, by said two-tier daemon, the filtered DLN, including reduced metadata for the filtered DLN relative to said DLN, from the capacity tier of object storage into a performance tier of storage of the storage system for processing by said application, wherein said dynamically loading by said two-tier daemon comprises:

creating an entry into a performance tier namespace of said performance tier;

receiving a first acknowledgement from said performance tier;

inserting said filtered DLN into said performance tier namespace of said performance tier by populating said filtered DLN with one or more objects representing one or more files of said filtered DLN; and receiving a second acknowledgement from said performance tier.

9. The non-transitory machine-readable recordable storage medium of claim 8, further comprising the step of merging said filtered DLN into said DLN following one or more modifications to said filtered DLN.

10. The non-transitory machine-readable recordable storage medium of claim 9, wherein said merging comprises the steps of converting a content of said performance tier into a merged DLN, traversing a directory tree associated with said DLN and, for each entry in said DLN, inserting a given entry from said merged DLN when said given entry is not in said DLN.

11. The non-transitory machine-readable recordable storage medium of claim 9, wherein said merging does not insert deleted files in said merged DLN.

12. The non-transitory machine-readable recordable storage medium of claim 8, further comprising the step of reorganizing one or more files in said filtered DLN based on one or more reordering directives.

13. The non-transitory machine-readable recordable storage medium of claim 8, wherein the reducing is performed by one or more of said two-tier daemon in the performance tier and a job scheduler, and wherein said two-tier daemon provides a third acknowledgement to said job scheduler in response to said receiving said second acknowledgement from said performance tier.

14. A system, comprising:
a memory; and
at least one processing device comprising a processor coupled to the memory, the at least one processing device being configured to:
in response to a job submitted by an application, obtaining, using a two-tier daemon, a dynamically loadable namespace (DLN) portion of a global single namespace of a file system, wherein said DLN is associated with the job and is obtained by said two-tier daemon from a capacity tier of object storage of a storage system;
obtain one or more filtering directives from a user;
reduce said DLN using a filtering mechanism on a directory tree associated with said DLN, based on said one or more filtering directives, by removing one or more files in said directory tree of said DLN that do not satisfy one or more requirements of said one or more filtering directives to generate a filtered DLN; and
dynamically load, by said two-tier daemon, the filtered DLN, including reduced metadata for the filtered DLN relative to said DLN, from the capacity tier of object storage into a performance tier of storage of the storage system for processing by said application, wherein said dynamically loading by said two-tier daemon comprises:

creating an entry into a performance tier namespace of said performance tier;

receiving a first acknowledgement from said performance tier;

inserting said filtered DLN into said performance tier namespace of said performance tier by populating said filtered DLN with one or more objects representing one or more files of said filtered DLN; and receiving a second acknowledgement from said performance tier.

15. The system of claim 14, wherein the reducing is performed by one or more of said two-tier daemon in the performance tier and a job scheduler, and wherein said two-tier daemon provides a third acknowledgement to said job scheduler in response to said receiving said second acknowledgement from said performance tier.

16. The system of claim 14, wherein said at least one processing device is further configured to merge said filtered DLN into said DLN following one or more modifications to said filtered DLN.

17. The system of claim 16, wherein said merging comprises the steps of converting a content of said performance tier into a merged DLN, traversing a directory tree associated with said DLN and, for each entry in said DLN, inserting a given entry from said merged DLN when said given entry is not in said DLN.

18. The system of claim 16, wherein said merging does not insert deleted files in said merged DLN.

19. The system of claim 14, wherein said at least one processing device is further configured to reorganize one or more files in said filtered DLN based on one or more reordering directives.

20. The system of claim 14, further comprising a performance tier of storage and a capacity tier of object storage.

* * * * *